United States Patent [19]

Zulaski

[11] 3,771,043
[45] Nov. 6, 1973

[54] SYSTEM FOR POWERING A COMBINATION OF VARIABLE BURDEN AND FIXED BURDEN VOLTAGE DEPENDENT LOADS FROM A HIGH IMPEDANCE SOURCE

[75] Inventor: John A. Zulaski, Mount Prospect, Ill.

[73] Assignee: S & C Electric Co., Chicago, Ill.

[22] Filed: Dec. 20, 1971

[21] Appl. No.: 209,851

[52] U.S. Cl. .................................. 320/39, 323/4
[51] Int. Cl. .............................................. H02p 7/06
[58] Field of Search ............ 320/32, 33, 39, DIG. 2, 320/59; 323/DIG. 2, 4, 8; 318/139

[56] References Cited
UNITED STATES PATENTS

| | | |
|---|---|---|
| 3,697,850 | 10/1972 | Heinrich et al. ................... 320/59 X |
| 3,524,124 | 8/1970 | Perkinson ........................ 320/39 UX |
| 3,375,434 | 3/1968 | Shapiro .................................... 323/4 |
| 3,517,295 | 6/1970 | Lapuyade ......................... 320/39 X |
| 2,847,179 | 8/1958 | Payzer et al. .................... 318/139 X |
| 3,443,191 | 5/1969 | Medlar ............................. 320/40 X |

Primary Examiner—J. D. Miller
Assistant Examiner—Robert J. Hickey
Attorney—Ronald L. Engel et al.

[57] ABSTRACT

A regulating function is accomplished to provide a means of powering a combination of fixed burden and variable burden voltage dependent loads from a single high impedance source of power.

5 Claims, 4 Drawing Figures 3,771,043

SYSTEM FOR POWERING A COMBINATION OF VARIABLE BURDEN AND FIXED BURDEN VOLTAGE DEPENDENT LOADS FROM A HIGH IMPEDANCE SOURCE

This invention relates, generally, to electrical energy supply systems and it has particular relation to such systems in which a single high impedance power source energizes a variable voltage dependent burden, such as a chargeable battery and a fixed burden voltage dependent load such as a relay.

A high impedance source of electrical energy inherently has very poor voltage regulation, i.e., the output voltage varies greatly for small changes in burden. This lack of regulation makes the high impedance source practically useless as a power source for voltage dependent loads.

Accordingly, among the objects of this invention are: To provide for energizing a combination of a variable burden and fixed burden voltage dependent load from a single high impedance source of electrical energy; to maintain essentially constant the burden applied to the high impedance source, independent of the variable load; and to maintain essentially constant the voltage across the variable burden voltage dependent load.

Figure 2:
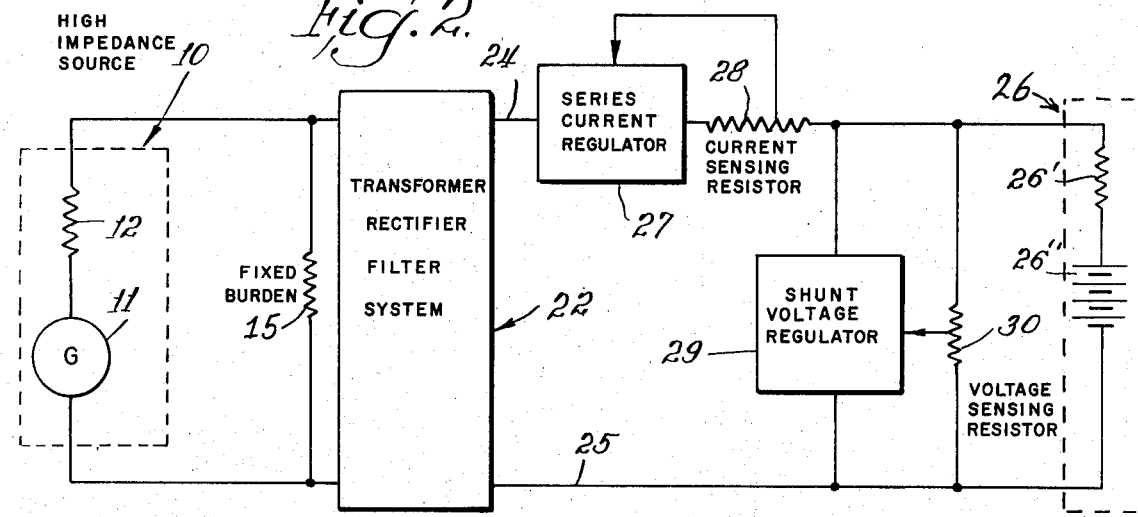
FIG. 2 illustrates by a block diagram a particular application of the system shown in FIG. 1 for use in conjunction with charging a battery.
Figure 4:
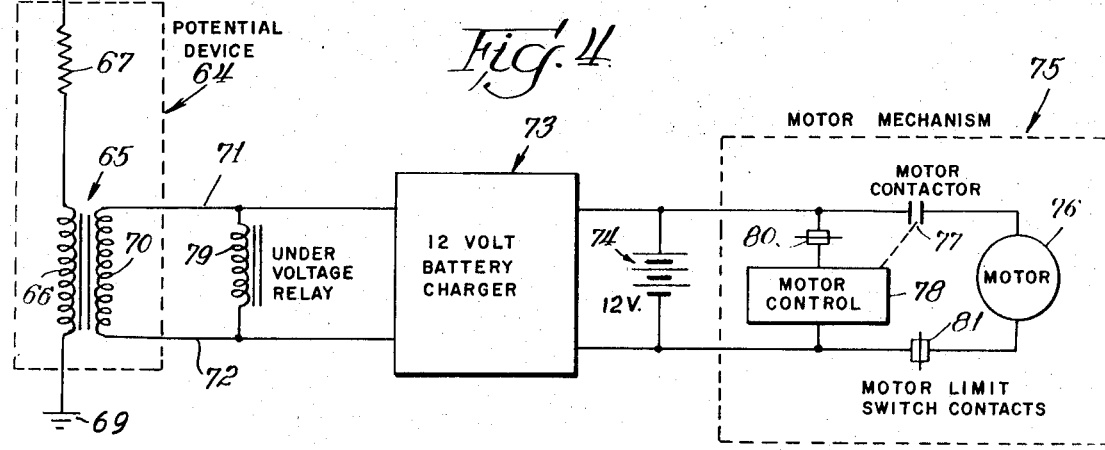
Figure 3:
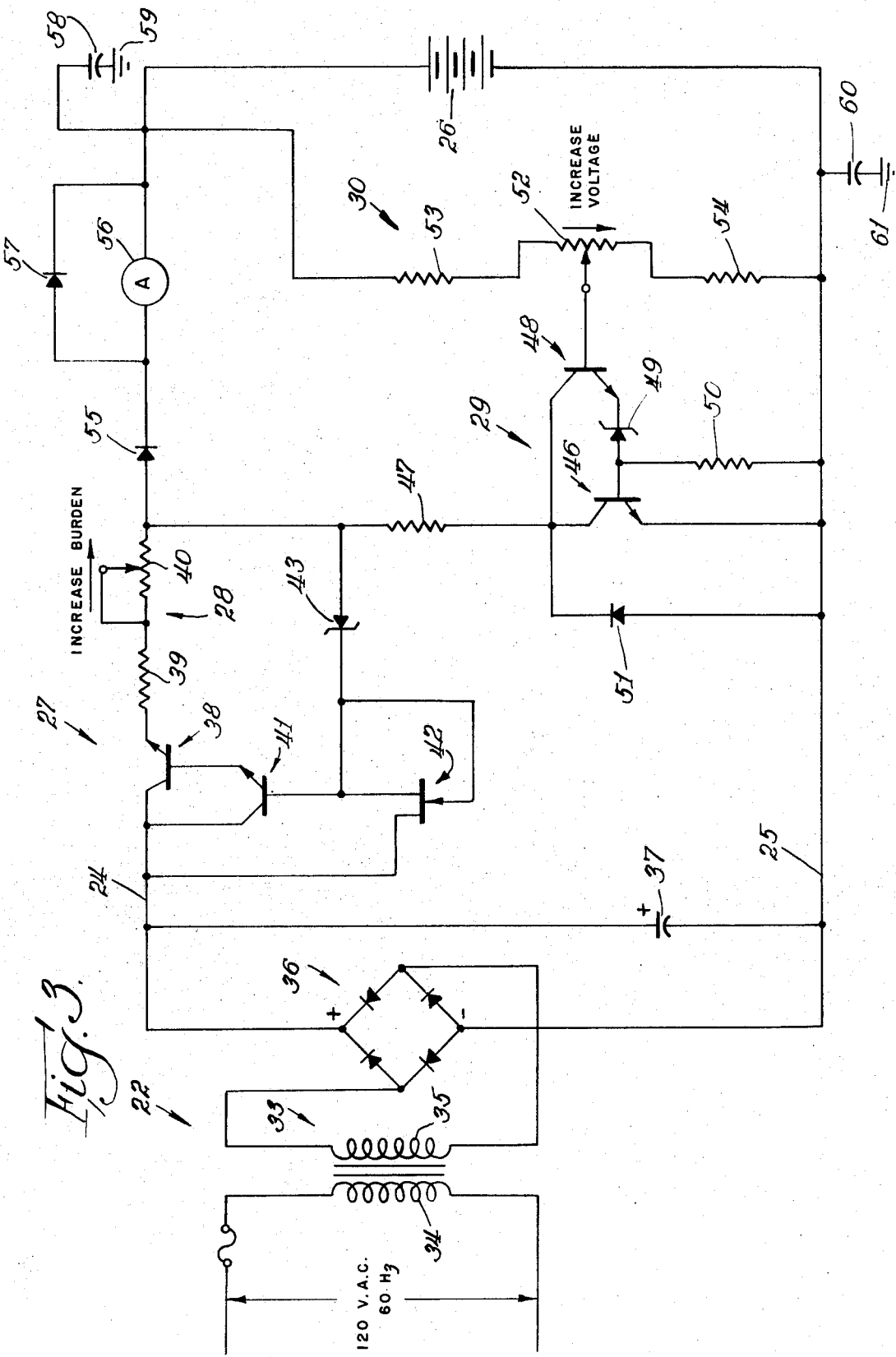
FIG. 3 shows an example of circuit design details that can be employed for the system illustrated in FIG. 2.

FIG. 4, sheet 1, illustrates a particular application of the system shown in FIGS. 2 and 3 for use in connection with a battery that is charged and is employed for operating a motor mechanism.

Figure 1:
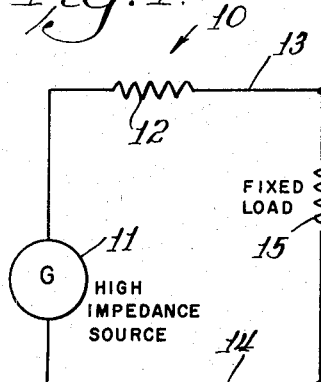
FIG. 1 is a block diagram which illustrates a control system embodying this invention.

Referring now particularly to FIG. 1 it will be observed that the reference character 10 designates, generally, a high impendance source which comprises an ideal voltage source 11, i.e., a source having no internal resistance operating, for example, at 60 Hz through a high resistance resistor 12 to energize conductors 13 and 14 with alternating voltage. A fixed load in the form of a resistor 15 is connected between the conductors 13 and 14 as an example of a fixed burden load. The system is arranged to energize a variable burden load 16 through a constant burden regulator 17.

As pointed out above a high impedance source, such as the source 10, inherently has very poor voltage regulation. In accordance with this invention the constant burden regulator is employed and is illustrated, generally, at 17. It is interposed between the fixed load 15 and the variable burden 16 and comprises a constant current source 18 and a shunt regulator 19, the latter being connected to the constant current source 18 on the side of the variable burden load 16.

FIG. 2 shows the application of the system illustrated in FIG. 1 for battery charging purposes. Here the high impedance source 10 has its output applied across fixed burden 15 and to a transformer-rectifier-filter system that is indicated, generally, at 22. The system 22 is arranged to charge a battery 26 which constitutes a variable burden load since it requires a greater charging current at the beginning of the charging cycle then is required near the end when the battery is fully charged. Resistor 26' represents the internal resistance of the battery 26. The battery internal cell voltage is represented at 26''.

In order to accommodate the variation in charging current for the battery 26 there is provided a series current regulator that is indicated, generally, at 27. Current flow from it takes place through a current sensing resistor 28 to the battery 26 and to a shunt regulator 29. The voltage drop along the current sensing resistor 28 is applied to the series current regulator 27 such that the current flow is maintained essentially constant.

As the internal cell voltage 26'' increases on charging, the current requirements for the battery 26 decrease and it is necessary to dispose of the excess current available from the series current regulator 27. For this purpose the shunt voltage regulator, indicated generally at 29, is connected across the battery 26 and is under the control of a voltage sensing resistor 30 which also is connected across the battery 26. The relation between the shunt voltage regulator 29 and the voltage sensing resistor 30 is such that the current flow through the shunt voltage regulator 29 increases as the current demand for charging the battery 26 decreases.

It will be understood that various circuit connections can be employed for the system illustrated in FIG. 2. For example, those illustrated in FIG. 3 can be used. Here it will be observed that the transformer-rectifier-filter system 22 comprises a transformer, shown generally at 33, having a primary winding 34 which is connected to a 120VAC 60Hz source, for example, the high impedance source 10 previously referred to. The transformer 33 includes a secondary winding 35 which is connected to energize a full wave bridge rectifier that is indicated at 36. A capacitor 37 is connected across the rectifier 36 for reducing the A.C. ripple in its output. The rectifier 36 is connected between conductors 24 and 25 for charging the battery 26. The current flow to the battery 26 is under the control of the series current regulator 27 and the shunt voltage regulator 29.

For illustrative purposes the series current regulator 27 is comprised of a series pass transistor 38, driver transistor 41, zener diode 43, field effect transistor 42 and the current sensing resistor 28. The resistor 28 comprises a series fixed resistor 39 and a variable resistor 40, the latter being employed for adjusting the current output of the series current regulator 27. The series pass transistor 38 is controlled by the driver transistor 41 having associated therewith the field effect transistor 42 in conjunction with the zener reference diode 43 which is connected between the variable resistor 40 and the base of the driver transistor 41.

The shunt voltage regulator 29 is comprised of shunt transistor 46, collector resistor 47, stabilizing resistor 50, zener voltage reference 49, comparison transistor 48 and voltage divider 30. The shunt transistor 46 is connected between the conductor 25 and variable resistor 40 through the collector resistor 47 which limits the maximum current flow that can be bypassed around the battery 26. The shunt transistor 46 is under the control of the comparison transistor 48 and the zener voltage reference diode 49 to which the stabilizing resistor 50 is connected from conductor 25. A diode 51 is connected between the collector resistor 47 and the conductor 25 and across the shunt transistor 46. The shunt voltage regulator 29 is under the control of the voltage sensing resistor 30 which includes a variable resistor 52 that is connected to the base of the comparison transistor 48 and series sections 53 and 54. By adjusting the variable resistor 52 the amount of current flowing through the shunt voltage regulator 29 and bypassing the battery 26 can be changed.

The current flow to the battery 26 for charging takes place through a diode 55 which prevents reverse current flow and through an ammeter 56 which measures the magnitude of the charging current. A diode 57, paralleling the ammeter 56 preserves a continuity of the charging circuit should the ammeter 56 become open circuited. The positive side of the battery 26 is connected through a capacitor 58 to ground 59. Conductor 25 is connected through a capacitor 60 to ground 61.

As pointed out above the series current regulator 27 functions to maintain a constant current flow through the current sensing resistor 28 to the battery 26. The base to emiter voltage of transistors 38 and 41 is dependent upon the voltage difference between the zener reference voltage from the zener diode 43 and the current sensing voltage appearing as the voltage drop across the resistor 28. It will be assumed that the system is operating and has stabilized, that the battery 26 is demanding current in excess of that which the series current regulator 27 is passing, and that the shunt voltage regulator 29 is not in the circuit. Should a further increase in current flow to the battery 26 be demanded there will be a slightly increased voltage drop across the current sensing resistor 28 which tends to turn off the transistors 38 and 41. If the current required by the battery 26 decreases, there is a corresponding reduction in the voltage drop across the current sensing resistor 28 and transistors 38 and 41 are driven harder into conduction. It will be seen that the circuit is such that the series current regulator 27 automatically maintains a fixed voltage drop across the current sensing resistor 28. The main function of field effect transistor 42 is to provide a constant current source for the zener voltage reference 43. While a resistor could be employed from collector to base of transistor 41, preferably the field effect transistor 42 is employed since it improves the regulation of the circuit with regard to input voltage variations.

Since the series current regulator 27 automatically functions to maintain a fixed current flow to the battery 26 which may require a variable current flow, the shunt voltage regulator 29 is employed to bypass the excess current flow not required by the battery 26.

In describing the functioning of the shunt voltage regulator 29 it will be assumed that the circuit has stabilized and that the shunt transistor 46 is conducting the excess current available from the series current regulator 27 to the return path of conductor 25. As pointed out above collector resistor 47 limits the maximum current that can flow through the shunt transistor 46. The zener voltage reference diode 49 maintains a voltage reference for the emitter of comparison transistor 48. The voltage sensing resistor 30, which is connected across the battery 26, is employed to sample the voltage appearing across its terminals. Transistor 48 compares the sampled voltage provided at the voltage sensing resistor 52 with the reference voltage provided by zener diode 49 and amplfies the difference signal. Resistor 50 stabilizes the zener diode 49. If the terminal voltage of the battery 26 should decrease, indicating a need for increase in charging current to the battery 26, then transistor 48 tends to turn off, thereby reducing the base drive for the shunt transistor 46. This will result in less current being shunted through the collector resistor 47 and the transistor 46 and allow more current to flow into the battery 26. If the terminal voltage of the battery 26 should increase, indicating a reduction in need for charging current to it, then transistor 48 is driven harder to conduction, thereby causing transistor 46 to conduct harder. The resulting increase in current shunted from the series current regulator 27 through the transistor 46 and resistor 47 leaves less current available for the battery 26.

The zener reference voltage 49 is selected to have a temperature coefficient which, in combination with the temperature coefficients of the transistors 46 and 48, compensates for variations in the terminal voltage of the battery 26 with temperature variations. This avoids problems of gassing, water loss and self discharge of the battery 26 under high temperature conditions.

FIG. 4 illustrates a commercial application of the system shown in FIG. 2 using the circuit connections illustrated in FIG. 3. Here the high impedance source comprises a resistor Potential Device, that is indicated, generally, at 64. It includes a series transformer, indicated generally at 65, having a primary winding 66 which is connected through a resistor 67 to a high voltage conductor 68. The primary winding 66 is connected to ground as indicated at 69. The transformer 65 has a secondary winding 70 to which conductors 71 and 72 are connected. They are arranged to energize the winding of an undervoltage relay, to be described, and a battery charger that is indicated, generally, at 73. The constant burden battery charger 73 may employ the circuit connections illustrated in FIG. 3 and described hereinbefore. The battery charger 73 is connected to maintain in charged condition a battery 74 which corresponds to the battery 26 in FIGS. 2 and 3 and to the variable burden load 16 of FIG. 1.

The battery 74 can be employed for various purposes such as for operating a motor mechanism, indicated generally at 75, that is arranged to operate a circuit interrupter or circuit breaker between open and closed positions. The motor mechanism 85 includes a direct current motor 76 which is energized when contacts 77 of a motor control 78 are closed. It will be understood that the motor control 78 may be manually operated or it may be automatically operated by relays. When the contacts 77 are closed to energize the motor 76, a relatively heavy load or high current is applied to or drawn from a battery 74. However, the charging current to the battery 74 is limited by the series current regulator 27 in the manner hereinbefore described while the shunt regulator 29 is essentially open circuited. The system resumes normal operation for charging the battery 74 on opening of the contacts 77.

For illustrative purposes it is pointed out that the series transformer 65 may have a winding ratio of 65 to 1, that the resistor 67 may have a value of 8.0 Megohms and the conductor 68 may be energized with 60 Hz at a voltage of 40 Kv. The potential device 64 may have an output rating of 30 voltamperes at a voltage of 40 Kv. The potential device 64 then functions substantially as a constant current source. In order to maintain a fixed output voltage, assuming a constant input voltage to the transformer 65, the burden applied to the secondary winding 70 must be constant. In the system shown in FIG. 4 the load comprises the 12 volt battery charger 73 and a winding 79 of an under voltage relay that is arranged to control contacts 80 connected in series with the motor control 78. In the event that the conductor 68 should be deenergized and, since contacts 80 are then closed, the motor control 78 can be operated to energize the motor 76. After the motor 76 has performed its function a limit switch 81 is opened to deenergize the motor 76. Under these circumstances there is no load applied to the battery 74. This is desirable since the conductor 68 may be deenergized for a substantial length of time. The constant burden battery charger 73 will not discharge the battery 26 because the diode 55 is blocking.

It will be understood that the battery charger 73 normally provides proper charging current to maintain the required charge on the battery 74 independently of input voltage, temperature and load. The system will be required to operate under short circuit conditions at infrequent intervals when the motor control 78 is operated to energize the motor 76. Thus the voltage across the secondary winding 70 of the series transformer 65 is not affected by the load supplied by the battery 74 or the charge requirements of the battery 74 because of the constant current regulator 27, FIG. 2, included in the battery charger 73.

If the battery 26 is replaced in the field, the battery charger 73 will not be affected by the open circuit since all of the current from the current regulator 27 then flows through the shunt regulator 29.

The battery charger 73 employing the circuitry shown in FIG. 3 has the following features:

1. Battery charger input current is not affected by changes in the state of charge of the battery or load variations, including short circuit and open circuit.
2. Battery charging rate is automatically controlled by the battery terminal voltage and state of charge.
3. Fail safe circuitry prevents discharge of the battery in the event of loss of source voltage or an internal failure of the charger.
4. Charger cannot be damaged by short circuit or open circuit of the output terminals.
5. Burden or maximum charge rate adjustment.
6. Regulated output voltage adjustment.

For example, the battery charger 73 can conform to the following:

INPUT SPECIFICATIONS

Input Voltage Operating Range — 108 VAC–140 VAC
Input frequency — 50–60 Hz
Input Current Regulation
  Effect of Charger Load — input current will vary less than 1% with charger output load varying from open circuit to short circuit.
  Effect of Input Voltage — input current varies in direct proportion to input voltage variations.
Maximum Burden Adjustment Range — 4.0 VA to 17.0 VA
Operating Temperature Range — 40° F to +160° F

OUTPUT SPECIFICATIONS

Current Capability — 500 ma max. at 13 volt D.C.
Max. Output Voltage Adjustment — 12 VDC to 14 VDC Output Voltage Regulation
  Line Regulation — ±1% from 108 volt to 140 VAC
  Load Regulation — ±1% from
    0–130 ma for 8 VA
    0–400 ma for 30 VA
Temperature coefficient — −4mv/°C
Metering — 0–500 ma D.C. 5% Full Scale Accuracy
Terminations — 4 pt. terminal block

I claim:

1. In a high voltage alternating current electrical transmission system having a high impedance alternating current source, a fixed burden voltage dependent sensing device connected to said alternating current source for sensing the voltage of the transmission system by sensing the voltage supplied by the current source; an electrical energy supply system for supplying electrical energy to a variable burden load without affecting the voltage supplied by the alternating current source comprising:

a constant current source means connecting in series circuit relation between the alternating current source and the variable burden load for supplying a constant current to said variable burden; and a voltage regulator means connected in parallel circuit relationship with the variable burden load for shunting the current from said constant current source means as said variable burden load varies so that the voltage supplied by the high impedance source is not affected by the varations of said variable burden load and so that the sensing device can accurately sense the voltage of the transmission system without being affected by the variations of the said variable burden load.

2. An electrical energy supply system as claimed in claim 1 wherein a rectifier means is connected across said alternating current source, for rectifying that current supplied by said alternating current source.

3. An electrical energy supply system as claimed in claim 1 wherein said constant current source means limits current flow from said alternating current source when the circuit to said variable burden load is short circuited and said voltage regulator means shunts current flow from said alternating current source when the circuit to said variable burden load is open.

4. An electrical energy supply system as claimed in claim 1 wherein the variable burden load comprises a chargeable battery, a motor is energizable from said battery on closure of normally open contacts, and a motor control energizable from said battery is arranged to close said normally open contacts; and the sensing device comprises an under voltage relay having a winding connected across said alternating current source and having normally closed contacts in series with said motor control, said normally closed contacts being held open as long as said winding is energized at normal voltage from said alternating current source.

5. An electrical energy supply system as claimed in claim 4 wherein said high impedance source is a potential device.

* * * * *